Jan. 3, 1961  D. C. CHOICE  2,966,751
SNOW AND ICE REMOVAL VEHICLE
Filed May 24, 1956  2 Sheets-Sheet 1
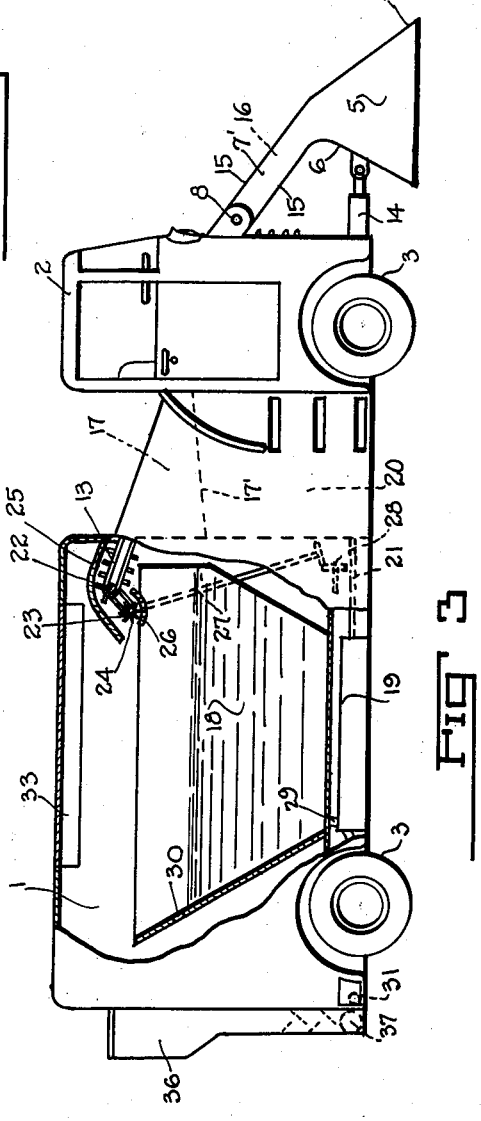
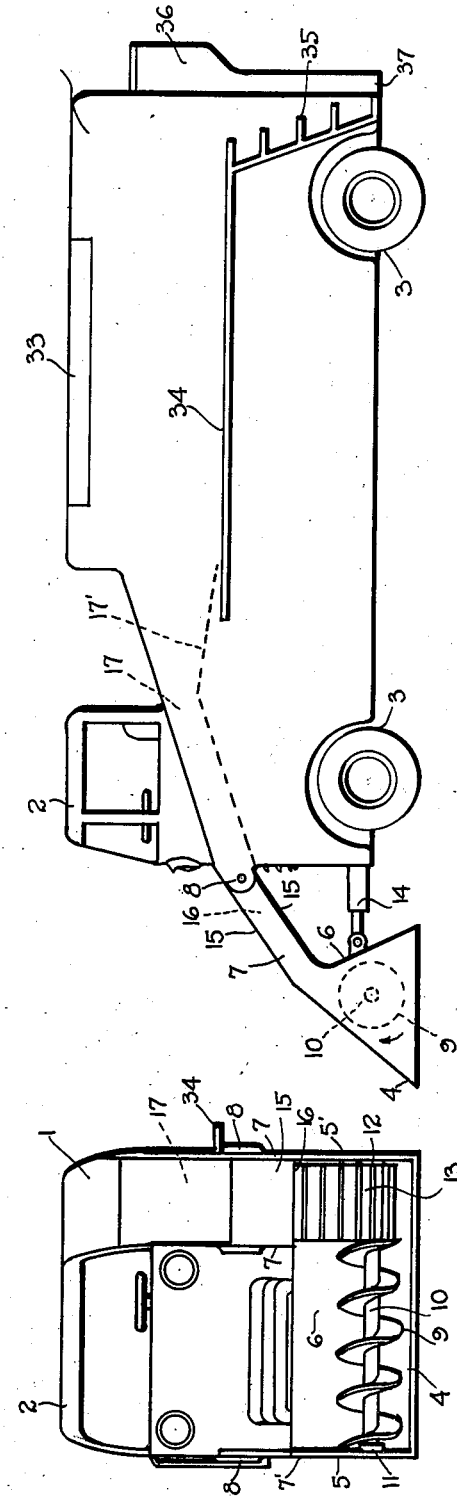
INVENTOR.
DAVID C. CHOICE
BY
Charles Richard Werner
ATTORNEY Jan. 3, 1961 D. C. CHOICE 2,966,751
SNOW AND ICE REMOVAL VEHICLE
Filed May 24, 1956 2 Sheets-Sheet 2
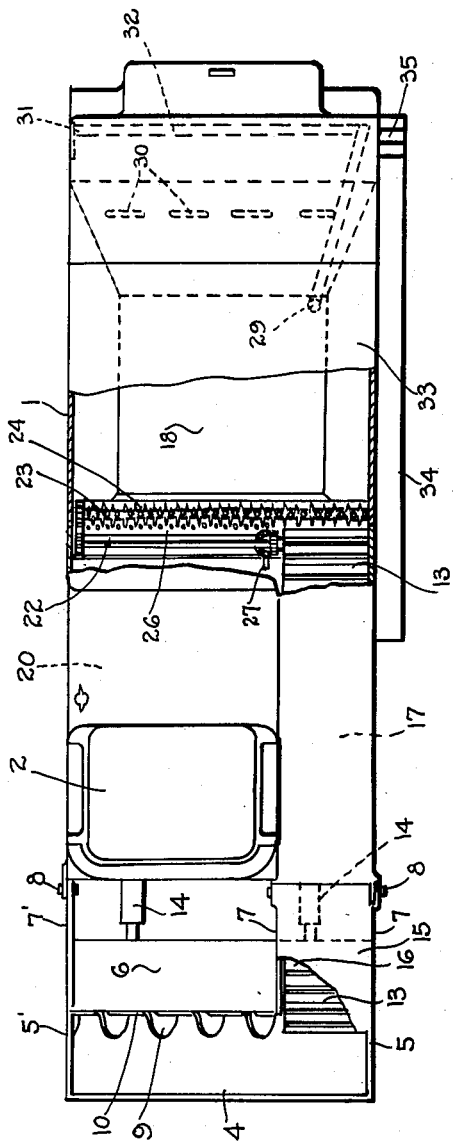
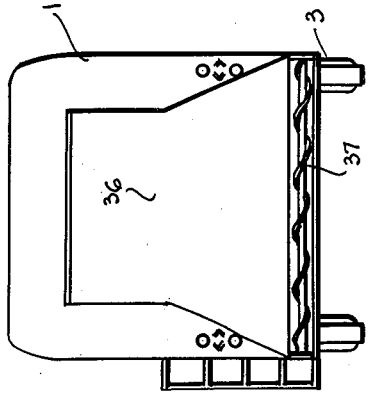
INVENTOR.
DAVID C. CHOICE
BY
Charles Richard Werner
ATTORNEY

United States Patent Office 2,966,751
Patented Jan. 3, 1961

2,966,751

SNOW AND ICE REMOVAL VEHICLE

David C. Choice, Chicago, Ill.
(1359 Madera Ave., Menlo Park, Calif.)

Filed May 24, 1956, Ser. No. 587,081

3 Claims. (Cl. 37—12)

This invention relates in general to snow and ice removal devices and in particular to a vehicle for scooping up, pulverizing and liquifying snow and ice and discharging the liquid into the sewer or other suitable depository.

In the present practice of cleaning the streets and roadways of ice and snow it is either pushed toward the sides of the street with snow plows and left to melt or loaded into trucks for dumping elsewhere.

With my invention the snow and ice is converted into liquid which can be discharged into the street sewers, the heated water aiding in melting and washing away additional snow and ice in the streets.

With the above in mind the objects of my invention are:

First; to provide a snow and ice removal vehicle with a scoop for scraping and accumulating snow and ice in the scoop, moving the accumulated snow and ice toward one side of the scoop, conveying it by an endless conveyor to a melting chamber in which it is liquified by heating, and discharging the liquid from the vehicle.

Second; to provide a pulverzing unit intermediate the conveyor and the melting chamber, the snow and ice being conveyed from the scoop to the pulverizer where it is disintegrated and discharged into the melting chamber.

Third; to provide a liquid storage tank in which the heating chamber is located, with overflow means being provided from the heating chamber to the storage tank, and means for discharging the liquid from the storage tank.

To provide a salting and sanding attachment operable simultaneously with the scooping and liquifying of the snow and ice to render the streets safer for vehicles.

Other objects and advantages as well as the construction and operation of my invention will be apparent by reference to the following description in connection with the accompanying drawings in which:

Fig. 1 is a front elevational view of the snow and ice removing machine comprising my invention.

Fig. 2 is a side elevational view of the same from the conveyor side.

Fig. 3 is a side elevational view on the other side of the vehicle with parts being broken away in section to better illustrate certain other parts.

Fig. 4 is a top plan view of the snow and ice removing vehicle with parts being broken away for clarity of illustration of other parts.

Fig. 5 is a rear elevational view of my invention.

Referring now to the drawings by numerals of reference, 1 designates a vehicle body with suitable cab 2 and running gear 3. The normal components of a vehicle of this type, such as engine, transmission, differential, etc., have not been illustrated nor will they be described, inasmuch as my invention does not reside in any of those components.

A scoop 4 with sides 5 and 5' and back 6 has arms 7 and 7' extending angularly upwardly and rearwardly for suitable pivotal connection at 8 to brackets on the body 1.

An auger 9 on shaft 10 is journaled at 11 and 12 transversely of the scoop, the auger extending to within a predetermined distance from side 5' of the scoop, an endless conveyor 13 being rollingly mounted on the auger shaft 10. The scoop may be raised and lowered by any suitable means. I have shown hydraulic actuators 14 constructed and operated in a manner well known to those skilled in the art.

The space between the arms 7 is provided with top and bottom covers 15 forming a chute 16 for the conveyor, and extending chute 17 aligning with chute 16 and covering the conveyor as it extends angularly upward to the upper portion of body 1. A portion of the bottom 17' of chute 17 may be inclined downwardly as shown in Fig. 3 to drain liquid dripping from the conveyor to the interior of the body 1 which comprises a large liquid storage tank.

Positioned within the body 1 is a melting chamber 18 below which suitable heating element 19 is positioned, a fuel supply tank 20 and feed line 21 supplying fuel to the heating element.

The upper end of conveyor 13 is suitably carried on shaft 22 which in turn may drive shaft 23 on which a pulverizer 24 is mounted. Shield 25 directs the snow and ice downwardly as it reaches the end of the conveyor and a perforated shield 26 under the pulverizer keeps large particles in contact with the pulverizer until broken up, the perforations permitting liquid to drain into the melting chamber 18. Any suitable driving means such as shaft 27 to a driven member 28 may be employed to actuate the pulverizer, conveyor and auger, such driving mechanism being well within the ability and knowledge of one skilled in the art to design.

Drain means 29 may be provided from the melting chamber 18 as well as an overflow port 30 below the upper level of said chamber, the overflow liquid gravitating into the body of the vehicle 1, as aforementioned, said body comprising a liquid storage tank. Preferably on the right hand or curb side of the vehicle is located a discharge outlet 31 through which liquid may be discharged at will by the vehicle operator even during movement of the vehicle or if desired, an extension hose 32 may be extended from the vehicle so the liquid can be directed to any specific disposal location.

A top inspection door 33, cat walk 34 and ladder 35 may be provided for inspecting the interior components of the vehicle.

A salt and sand spreader comprising storage chamber 36 and spreader 37 may be employed at the rear end of the vehicle and may be driven and controlled in any suitable manner well known in the art.

The operation of the snow and ice removal vehicle is relatively simple. With the burner or heating element 19 in operation, the scoop is lowered to scooping position as the vehicle moves along the street. The rotating auger will continually urge snow and ice to one side of the scoop where the conveyor will carry it upwardly until it gravitates on to the pulverizer where it will be broken up and directed into the melting chamber and converted to liquid.

When the level of the liquid reaches the overflow port 30 it will discharge into the storage tank body 1, from where it may be continuously discharged through outlet 31 or may be stored until an opportune time is reached for discharge of the liquid as for instance, directly into a street sewer outlet. Continuous discharge from the melting chamber 18 through drain 29 may be effected by the operator if desired by suitable valving thereof out through discharge outlet 31.

All elements can be individually controlled by the operator from within the cab as the vehicle is propelled along the street. The salt and sand spreader will coat the street after the snow and ice have been removed making my device a very practical and useful one which will radically change the present method of snow and ice removal.

It is obvious that changes in form, proportion and details of construction may be resorted to without departing from the spirit of my invention and I reserve all rights to such changes as come within the scope of these specifications and the claims which follow.

What I claim as new and desire to secure by Letters Patent is:

1. In a snow and ice removal vehicle, a vehicle body including a liquid receiving and storage tank, an inner chamber in the tank, a common bottom for the liquid receiving and storage tank and the inner chamber in the tank, heating means below the common bottom, means for conveying snow and ice from the street to the inner chamber, overflow means from the inner chamber to the liquid receiving and storage tank, and discharge means for the melted liquid from the liquid receiving and storage tank.

2. The structure as specified in claim 1, and a transverse pulverizer above the inner chamber, a shield above the pulverizer, directing snow and ice from the conveying means to the pulverizer below the shield and keeping the snow and ice in intimate contact with the pulverizer.

3. The structure as specified in claim 1, and a transverse pulverizer above the inner chamber, a perforated shield below the pulverizer, a shield above the pulverizer directing snow and ice from the conveying means to the pulverizer between the two shields, said shields keeping snow and ice in intimate contact with the pulverizer, the liquid discharging through the perforated shield and gravitating to the inner chamber.

References Cited in the file of this patent

UNITED STATES PATENTS

| | | |
|---|---|---|
| 608,827 | Boorman et al. | Aug. 9, 1898 |
| 834,944 | Stevens | Nov. 6, 1906 |
| 1,562,842 | Milne et al. | Nov. 24, 1925 |
| 1,642,000 | Weismantel | Sept. 13, 1927 |
| 1,739,331 | Sidella | Dec. 10, 1929 |
| 2,104,363 | Devlin | Jan. 4, 1938 |
| 2,178,400 | Marino | Oct. 31, 1939 |
| 2,261,732 | O'Brien | Nov. 4, 1941 |
| 2,364,315 | Powell | Dec. 5, 1944 |
| 2,602,443 | Leary | July 8, 1952 |
| 2,605,760 | Cayas | Aug. 5, 1952 |
| 2,738,786 | Leary | Mar. 20, 1956 |